(12) United States Patent
Hammer et al.

(10) Patent No.: US 10,773,463 B2
(45) Date of Patent: Sep. 15, 2020

(54) METHOD FOR PRODUCING A COMPOSITE PART, AND COMPOSITE PART

(71) Applicant: Bayerische Motoren Werke Aktiengesellschaft, Munich (DE)

(72) Inventors: Maik Hammer, Bruckberg (DE); Michael Conze, Langenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 388 days.

(21) Appl. No.: 15/165,075

(22) Filed: May 26, 2016

(65) Prior Publication Data

US 2016/0263818 A1    Sep. 15, 2016

Related U.S. Application Data

(63) Continuation of application No. PCT/EP2015/050589, filed on Jan. 14, 2015.

(30) Foreign Application Priority Data

Feb. 10, 2014  (DE) ........................ 10 2014 202 357

(51) Int. Cl.
  *B29C 65/70*   (2006.01)
  *B29C 51/08*   (2006.01)
  (Continued)

(52) U.S. Cl.
  CPC ............ *B29C 65/70* (2013.01); *B29C 51/082* (2013.01); *B32B 5/18* (2013.01); *B32B 5/245* (2013.01);
  (Continued)

(58) Field of Classification Search
  CPC .................................................... B29C 65/70
  See application file for complete search history.

(56) References Cited

U.S. PATENT DOCUMENTS 3,879,245 A * 4/1975 Fetherston ............... A63C 5/12
                                                          156/245
3,917,770 A * 11/1975 Jackson .................. B29C 51/00
                                                           264/28
(Continued)

FOREIGN PATENT DOCUMENTS

| CN | 1094599 A | 11/1994 |
|---|---|---|
| CN | 1572459 A | 2/2005 |

(Continued)

OTHER PUBLICATIONS

DE10350787, machine translation. (Year: 2005).*

(Continued)

*Primary Examiner* — Robert A Vetere
(74) *Attorney, Agent, or Firm* — Crowell & Moring LLP

(57) ABSTRACT

A method is provided for producing a composite part, in particular a flat composite part, having a foam core that has a first and second cover layer which are bonded to the foam core on a first surface and a second surface, respectively. The method has the following steps: (a) heating the cover layers and the foam core (b) positioning the cover layers on the surfaces of the foam core, (c) positioning the foam core and the cover layers in a press or a mold which forms the completed composite part, (d) reshaping the foam core and the cover layers in the press or in the mold, wherein the cover layers can be positioned on the surfaces of the foam core, (e) cooling and bonding the cover layers and the foam core in the press or in the mold, and (f) removing the composite part from the press or from the mold.

13 Claims, 2 Drawing Sheets

(51) Int. Cl.
  *B32B 5/18* (2006.01)
  *B32B 5/24* (2006.01)
  *B32B 15/04* (2006.01)
  *B32B 27/06* (2006.01)
  *B32B 38/12* (2006.01)
  *B32B 37/06* (2006.01)
  *B32B 27/20* (2006.01)
  *B29L 9/00* (2006.01)
  *B29C 51/14* (2006.01)
  *B29K 105/04* (2006.01)
  *B29K 105/00* (2006.01)

(52) U.S. Cl.
  CPC .......... *B32B 15/046* (2013.01); *B32B 27/065* (2013.01); *B32B 27/20* (2013.01); *B32B 37/06* (2013.01); *B32B 38/12* (2013.01); *B29C 51/14* (2013.01); *B29K 2105/04* (2013.01); *B29K 2105/256* (2013.01); *B29L 2009/001* (2013.01); *B29L 2009/003* (2013.01); *B32B 2250/03* (2013.01); *B32B 2250/40* (2013.01); *B32B 2260/021* (2013.01); *B32B 2305/022* (2013.01); *B32B 2309/02* (2013.01); *B32B 2309/04* (2013.01); *B32B 2309/105* (2013.01); *B32B 2309/12* (2013.01); *B32B 2311/24* (2013.01); *B32B 2605/08* (2013.01)

(56) References Cited

U.S. PATENT DOCUMENTS

| | | | | |
|---|---|---|---|---|
| 4,867,826 | A | | 9/1989 | Wayte |
| 5,571,610 | A | * | 11/1996 | Loftus .................. B29C 70/16 428/297.4 |
| 6,618,944 | B1 | * | 9/2003 | Persson .................. B32B 15/04 29/897 |
| 6,746,643 | B1 | * | 6/2004 | Kannari .............. B29C 49/4823 264/523 |
| 2003/0030188 | A1 | | 2/2003 | Spengler |
| 2004/0028907 | A1 | * | 2/2004 | Wang ..................... B32B 27/08 428/412 |
| 2004/0234729 | A1 | | 11/2004 | Niebuhr et al. |
| 2008/0271968 | A1 | * | 11/2008 | Metzinger ........... F16D 25/0638 192/48.8 |
| 2009/0321002 | A1 | | 12/2009 | Spengler |
| 2011/0108667 | A1 | * | 5/2011 | Keller .................. B29C 51/082 244/119 |
| 2011/0229733 | A1 | * | 9/2011 | Numano ................ B23K 31/02 428/649 |

FOREIGN PATENT DOCUMENTS

| | | | | |
|---|---|---|---|---|
| DE | 78 38 105 U1 | | 3/1980 | |
| DE | 29 29 992 A1 | | 2/1981 | |
| DE | 36 41 127 A1 | | 6/1988 | |
| DE | 44 08 687 A1 | | 9/1995 | |
| DE | 101 05 591 A1 | | 8/2002 | |
| DE | 10105591 A1 | * | 8/2002 | ............ B29C 44/22 |
| DE | 103 50 787 A1 | | 5/2005 | |
| DE | 10350787 A1 | * | 5/2005 | ............ B29C 51/14 |
| DE | 10 2006 006 333 A1 | | 8/2007 | |
| EP | 1 284 182 A2 | | 2/2003 | |
| EP | 2 529 916 A1 | | 12/2012 | |
| EP | 2529916 B1 | * | 8/2015 | ............ B32B 37/06 |
| JP | 48-32169 A | | 4/1973 | |
| JP | 51-138749 A | | 11/1976 | |
| JP | 54-158471 A | | 12/1979 | |
| JP | 60-154019 A | | 8/1985 | |
| JP | 62-270309 A | | 11/1987 | |
| JP | 64-61224 A | | 3/1989 | |
| JP | 9-76261 A | | 3/1997 | |
| JP | 2007-196545 A | | 8/2007 | |
| WO | WO 99/16657 A1 | | 4/1999 | |

OTHER PUBLICATIONS

DE10105591, machine translation. (Year: 2002).*
EP2529916, Machine Translation. (Year: 2015).*
Chinese-language Office Action issued in counterpart Chinese Application No. 201580002701.1 dated Sep. 21, 2017 with English translation (12 pages).
International Search Report (PCT/ISA/210) issued in PCT Application No. PCT/EP2015/050589 dated Mar. 18, 2015 with English translation (eight pages).
German-language Written Opinion (PCT/ISA/237) issued in PCT Application No. PCT/EP2015/050589 dated Mar. 18, 2015 (10 pages).
German Search Report issued in counterpart German Application No. 10 2014 202 357.2 dated Sep. 17, 2014 with partial English translation (13 pages).
Chinese-language Office Action issued in counterpart Chinese Application No. 201580002701.1 dated May 3, 2018 with English translation (seven (7) pages).
Japanese-language Office Action issued in counterpart Japanese Application No. 2016-549368 dated Jul. 26, 2017 with English translation (11 pages).
Japanese-language Notice of Decision of Grant issued in counterpart Japanese Application No. 2016-549368 dated Oct. 25, 2017 (one page).
Japanese-language Argument in response to Office Action issued in counterpart Japanese Application No. 2016-549368 dated Oct. 11, 2017 (four pages).
Chinese Office Action issued in counterpart Chinese Application No. 201580002701.1 dated Jan. 5, 2017 with English translation (15 pages).

* cited by examiner

METHOD FOR PRODUCING A COMPOSITE PART, AND COMPOSITE PART

CROSS REFERENCE TO RELATED APPLICATIONS

This application is a continuation of PCT International Application No. PCT/EP2015/050589, filed Jan. 14, 2015, which claims priority under 35 U.S.C. § 119 from German Patent Application No. 10 2014 202 357.2, filed Feb. 10, 2014, the entire disclosures of which are herein expressly incorporated by reference.

BACKGROUND AND SUMMARY OF THE INVENTION

The invention relates to a method for producing a composite part, in particular, a planar or flat composite part having a foam core that has on a first and a second surface a first and second cover layer, respectively, which are integrally bonded to the foam core. The invention further relates to a composite part.

In the automotive sector, composite parts having a foam core which on both sides is connected to a cover layer are frequently used, for weight reasons. As a result of the foam core, these parts are very light. Through the choice of the material and the thickness of the cover layers, the composite part nevertheless has a high surface hardness and high stability.

The object of the invention is to provide a method for producing such a composite part, which method enables a simpler and more rapid production of the composite parts. The object of the invention is additionally to provide such a composite part which is easier to paint.

In order to achieve the object, a method is provided for producing a composite part, in particular, a planar or flat composite part having a foam core that on a first and a second surface has a first and second cover layer respectively, which are integrally bonded to the foam core. The method includes the following steps:

a) heating of the cover layers and the foam core;
b) positioning of the cover layers on the surfaces of the foam core;
c) positioning of the foam core and the cover layers in a press or a mold which represents the finished composite part;
d) forming of the foam core and the cover layers in the press, wherein the cover layers can be displaced on the surfaces of the foam core;
e) cooling and integral joining of the cover layers to the foam core in the press; and
f) removal of the part from the press.

The method according to the invention offers the advantage of a rapid and reliable production of such composite parts. In particular, the cover layers can be displaced relative to the foam core during the forming process. A mutual fixing of the cover layers and the foam core does not take place. Since the parts can be mutually displaced during the shaping process, the generation of stresses in or between the cover layers and the foam core during the cooling or integral connection of the parts is reliably prevented. The heating of the cover layers and the foam core can be realized, for instance, in the mold. However, it is also contemplated for this to take place already prior to the insertion of the foam core and cover layers into the mold, so that the occupancy time of the mold or press is reduced and a short production cycle is attainable. The uniform pressure in the mold ensures, moreover, that the cover layers and the foam core connect squarely to one another.

The forming preferably takes place in a time frame of 3 to 45 seconds. In this time frame, a uniform forming of the cover layers and the foam core is possible without damaging the cover layers and the foam core. The temperatures are preferably chosen such that a better deformability of the parts is possible, but these are not damaged by too high a temperature. Furthermore, the time span is chosen to be sufficiently short that a premature cooling of the parts, which would result in a connection of the parts before the final position in the mold is reached, can be precluded.

The heating of the cover layers and the foam core is realized, for instance, in a time frame of 30 seconds up to 5 minutes, wherein this time frame is dependent on the thickness of the cover layers or the foam core and of the materials used. Depending on the materials used, just the surface can be heated, or the entire part. The heating can take place already in the mold or the press. However, it is also possible for this to take place prior to the insertion of the parts into the press or into the mold. The heating is realized, for instance, for each cover layer or the foam core separately, in particular if these have different thicknesses or these must be heated to different temperatures for the forming.

The cooling and integral joining of the cover layers and the foam core preferably takes place in a time frame of 60 to 300 seconds. Preferably, the cooling is realized sufficiently slowly that occurring stresses between the cover layers and the foam core can be reduced.

In order to join the parts integrally to each other, it is necessary that the surface of the cover layers and/or the surface of the foam core are heated to the point where it softens but does not liquefy, so as to integrally bond to the respectively other part during the cooling. In particular, the temperature must not be increased to the point where the foam core is damaged, in particular collapses, due to the high temperatures. Preferably, the foam core is heated to a temperature of 160° C. to 200° C., and the cover layers to a temperature of 240'C to 380° C.

The temperature difference is created, for instance, by a brief temperature boost at the end of the heating phase.

The pressure with which the parts are pressed one upon the other in the press or mold is likewise dependent on the materials used. On the one hand, the pressure must be sufficiently high to deform the cover layers and the foam core. On the other hand, too high a pressure would lead to a compression of the pressure-sensitive foam core in relation to the cover layers. The composite part is formed, for instance, with a pressure of 0.03 N/cm$^2$ to 1.5 N/cm$^2$.

In the case of more complex parts, it is possible for the method steps a) to f) to be repeated after the removal of the composite part from the press, wherein another press or another mold is used. It is thereby possible that complex sections of the composite part, after the production of a basic shape, are further formed in a first method run, wherein the generation of stresses in or between the parts is prevented.

The integral connection of the cover layers and the foam core can be realized, for instance, by a softening or melting of the surfaces of the foam core or of the cover layers. However, it is also possible that between at least one cover layer and the foam core is arranged a film or an adhesive layer, which, when heated, softens and, when subsequently cooled, produces an integral connection between the cover layers und the foam core. For instance, a thermoplastic adhesive film can be used for this.

The cover layers can be pretreated prior to heating, in particular by coating or an anticorrosion measure, so that a composite part having a surface which is protected from corrosion or other influences is obtained.

Furthermore, it is possible for the foam core to be at least locally pressed and compressed in thickness.

The positioning of the cover layers on the surfaces of the foam core preferably takes place prior to the heating of the cover layers and the foam core.

In order to achieve the object, there is further provided a composite part comprising a foam core that on a first and a second surface has a first and second cover layer respectively, which are integrally bonded to the foam core, wherein the composite part is produced with a method according to the invention.

A first cover layer can consist, for instance, of metal, in particular of aluminum, and have a thickness of 0.2 mm to 0.4 mm. Previously known composite parts having cover layers made of fiber-reinforced plastic have the drawback that they are hard to paint, so that the possible purposes of use are restricted. A metal cove layer can be easily painted, so that a simple coloring of the composite part is possible, whereby further possible applications for the composite part are obtained. Moreover, the metal produces a composite part which has a very stable surface, yet which is still very light due to the foam core.

The second cover layer consists, for instance, of a fiber-reinforced plastic having a thickness of 0.2 mm to 1.0 mm.

The foam core has a thickness of up to 10 mm, for instance, wherein the thickness of the foam core can be adapted to the dimensions of the desired part.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
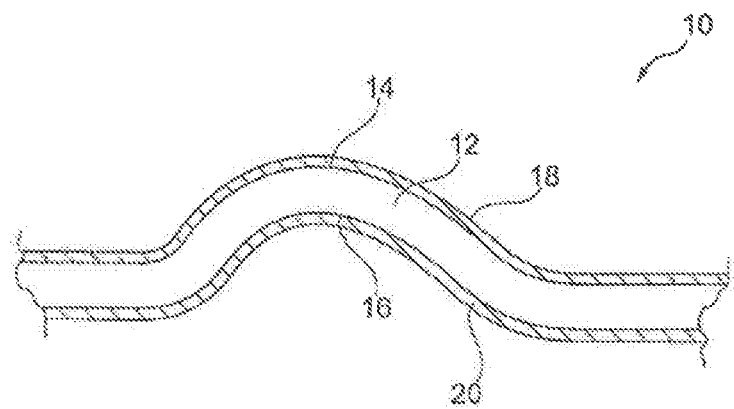
FIG. 1 is a cross section through a composite part according to an embodiment of the invention.
Figure 2:
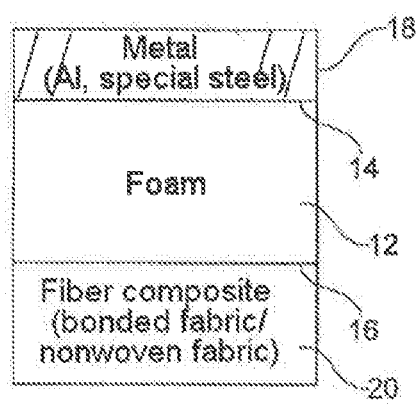
FIG. 2 is a schematic representation of the material structure of the composite part from FIG. 1.

FIGS. 1 and 2 show a composite part 10, which has a foam core 12 having a first surface 14 and a second surface 16. On the first surface 14 is applied a first cover layer 18, which consists of metal, in particular aluminum. On the second, opposite surface 16 is applied a second cover layer 20, which in the embodiment shown here consists of a fiber-reinforced plastic. Depending on the purpose for the composite part, other suitable materials can also be used as the cover layers.

The foam core 12 has a thickness of about 10 mm, wherein the thickness of the foam core 12 can be adapted to the respective application and can also be chosen to be thinner. In particular, the foam core 12 can also have different thicknesses. The first cover layer has a thickness of 0.2 to 0.4 mm, the second cover layer a thickness between of 0.2 mm and 1 mm.

The first cover layer 18 forms, for instance, the outer skin of the composite part 10. The metal surface is easier to paint than a plastics part, so that an easier coloring of the composite part 10 is possible. As a result of the foam core 12 and the fiber-reinforced second cover layer 20, the composite part is very light and nevertheless has a very high strength.

A method for producing such a composite part 10 is represented in FIGS. 3a to 3d.

In a first method step (FIG. 3a), the cover layers 18, 20 and the foam core 12 are heated. The heating is realized up to a temperature at which the surfaces 14, 16 of the foam core 12 or the surfaces of the cover layers 18, 20 soften, wherein the temperature is chosen such that a liquefaction of the cover layers 18, 20 or of the foam core 12 is prevented. In particular, it can be precluded that the temperature rises to the point where the foam core 12 collapses.

The heating of the cover layers 18, 20 and the foam core 12 can be realized in a separate oven. However, it is also possible for this to take place already in the mold 22 (see FIG. 3b), The heating in a separate oven offers the advantage that the occupancy time of the mold 22 is reduced and a rapid production cycle is possible.

After the heating, the cover layers 18, 20 are placed onto the surfaces 14, 16 of the foam core 12, and the foam core 12 with the applied cover layers 18, 20 is inserted into the mold 22.

Next the foam core and the cover layers 18, 20 are compressed by closing of the mold 22, wherein the mold 22 represents the shape of the finished composite part 10. Since the cover layers 18, 20 and the foam core 12 are not yet connected to each other, the cover layers 18, 20 can be displaced against the foam core 12. During the deformation of the cover layers 18, 20 and the foam core 12, no stresses can therefore arise between the individual layers.

The pressure with which the cover layers 18, 20 and the foam core 12 are deformed is dependent on the materials used. On the one hand, the pressure must be sufficiently high to be able to deform the parts, in particular the first, metal cover layer 18. On the other hand, too high a pressure must not give rise to a compression of the foam core 12 or to a damaging of the cover layers 18, 20.

Figure 3A:
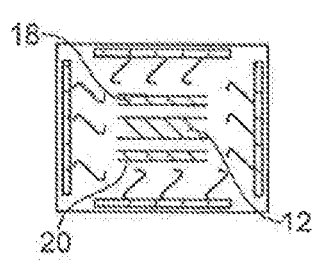
FIGS. 3a to 3d show the method steps of an exemplary method according to the invention for the production of the composite part from FIG. 1.
Figure 3B:
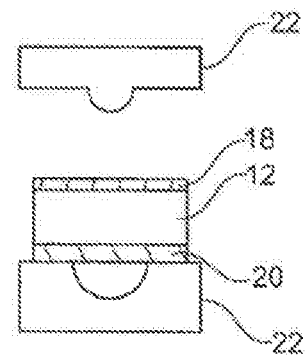
Figure 3C:
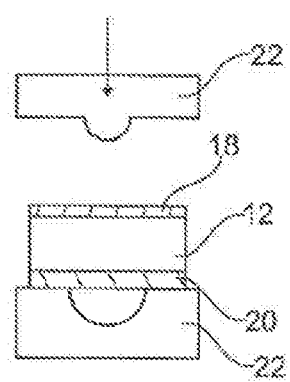
Figure 3D:
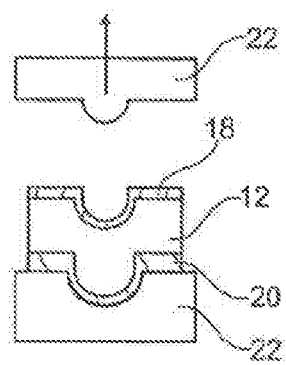

Next, the composite part 10 is cooled in the mold 22, whereupon an integral bond between the cover layers 18, 20 and the foam core 12, i.e. a bonding of the individual layers one to another, is obtained. After this, the finished composite part 10 can be removed from the mold 22 (FIG. 3d).

The time frame in which the cover layers 18, 20 and the foam core 12 are cooled and integrally bonded is dependent on the materials used and the thickness of the foam core 12 or cover layers 18, 20. Preferably, this time frame amounts to 60 to 300 seconds.

If a more complex shape of the composite part 10 is desired, the composite part can be reheated after completion of the method and can be inserted into a further mold 22 or press having a more complex shaping. In this mold 22, a further forming and subsequent cooling of the composite part 10 can be realized. Since the composite part 10 was heated prior to the forming, the cover layers 18, 20 can be displaced against the foam core 12 also when the process is repeated, so that, also in this second forming process, stresses between the cover layers 18, 20 and the foam core 12 cannot materialize.

Between the cover layers 18, 20 and the foam core 12 can also be provided additional layers, by which an integral connection of the cover layers 18, 20 and the foam core 12 is realized. These layers can have, for instance, a lower melting point, so that a lower temperature is sufficient to form and integrally bond the layers of the composite part 10. For instance, a thermoplastic adhesive film can be used.

Furthermore, the cover layers can be pretreated prior to the connection to the foam core 12, for instance with a corrosion protection, no that the finished composite part 10 has a better resistance to external influences.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a composite part comprising a foam core that on a first surface and a second surface has a first cover layer and a second cover layer respectively, which are integrally connected to the foam core, the method comprising the acts of:
    a) heating the cover layers and the foam core such that respective surfaces of the cover layers or the foam core soften and such that liquefaction of the respective surfaces of the cover layers or the foam core are prevented;
    b) after the heating of the cover layers and the foam core then positioning the cover layers on the respective surfaces of the foam core;
    c) positioning the foam core and the cover layers in a press or a mold configured to produce a finished composite part;
    d) deforming the foam core and the cover layers by application of pressure by closing the press or the mold, wherein the foam core and the cover layers are not fixed to each other prior to the deforming such that the cover layers can be displaced against the foam core and such that during the deforming no stresses can arise between the cover layers and the foam core;
    e) after the deforming, cooling of the foam core and the cover layers in the press or the mold and integral bonding of the foam core to the cover layers by the cooling in the press or the mold; and
    f) after the cooling in the press or the mold, removing the composite part from the press or the mold.

2. The method according to claim 1, wherein the forming act takes place in a time frame of 3 to 45 seconds.

3. The method according to claim 2, wherein the heating act takes place in a time frame of 30 seconds to 5 minutes.

4. The method according to claim 3, wherein the cooling and integral bonding act takes place in a time frame of 60 to 300 seconds.

5. The method according to claim 1, wherein the heating act takes place in a time frame of 30 seconds to 5 minutes.

6. The method according to claim 1, wherein the cooling and integral bonding act takes place in a time frame of 60 to 300 seconds.

7. The method according to claim 1, wherein the cover layers are heated to a temperature of 240° C. to 380° C., and the foam core is heated to a temperature of 160° C. to 200° C.

8. The method according to claim 7, wherein a temperature difference between the cover layers and the foam core is created by a short temperature boost at an end of the heating act.

9. The method according to claim 1, wherein the press or the mold forms the composite part with a pressure of 0.03 N/cm2 to 1.5 N/cm2.

10. The method according to claim 1, wherein the method acts a) to f) are repeated after the removal from the press or the mold, wherein another press or mold is used.

11. The method according to claim 1, further comprising the act of pretreating at least one of the cover layers by a coating or an anticorrosion measure.

12. The method according to claim 1, wherein at least locally the foam core is pressed and compressed in thickness.

13. The method according to claim 1, wherein the first cover layer is a metal.

\* \* \* \* \*